United States Patent [19]
Gelles et al.

[11] Patent Number: 5,281,663
[45] Date of Patent: Jan. 25, 1994

[54] HIGH IMPACT RESISTANCT BLENDS OF THERMOPLASTIC POLYESTERS AND MODIFIED BLOCK COPOLYMERS

[75] Inventors: Richard Gelles; William P. Gergen, both of Houston, Tex.; Robert G. Lutz, Santa Rosa, Calif.; Michael J. Modic, Houston, Tex.

[73] Assignee: Shell Oil Company, Houston, Tex.

[21] Appl. No.: 860,125

[22] Filed: Mar. 31, 1992

Related U.S. Application Data

[63] Continuation of Ser. No. 310,990, Feb. 17, 1989, abandoned, which is a continuation of Ser. No. 110,065, Oct. 15, 1987, abandoned, which is a continuation-in-part of Ser. No. 855,657, Jul. 31, 1985, abandoned.

[51] Int. Cl.$^5$ .............................................. C08L 53/02
[52] U.S. Cl. ........................................ 525/64; 525/74; 525/78; 525/90; 525/98
[58] Field of Search ................ 525/64, 74, 78, 98, 525/90

[56] References Cited

U.S. PATENT DOCUMENTS

| | | | |
|---|---|---|---|
| 4,101,605 | 7/1978 | Gargen et al. | 525/98 |
| 4,220,735 | 9/1980 | Dieck et al. | 525/90 |
| 4,226,952 | 10/1980 | Halasa et al. | 525/192 |
| 4,427,828 | 1/1984 | Hergenrother et al. | 525/66 |
| 4,429,076 | 1/1984 | Saito et al. | 525/88 |
| 4,578,429 | 3/1986 | Gergen et al. | 525/291 |
| 4,628,072 | 12/1986 | Shiraki et al. | 525/57 |
| 4,657,970 | 4/1987 | Shiraki et al. | 525/57 |
| 4,657,971 | 4/1987 | Shiraki et al. | 525/74 |

FOREIGN PATENT DOCUMENTS 085115 8/1983 European Pat. Off.
WO83/00492 2/1983 PCT Int'l Appl.

OTHER PUBLICATIONS

Modern Plastics Encyclopedia, 1971-72, pp. 25-28.
Modern Plastics Encyclopedia, Nov. 1971, pp. 66-67.

*Primary Examiner*—Ralph H. Dean

[57] ABSTRACT

The present invention relates to a high impact resistant polymeric composition comprising a polyester and a thermally stable modified selectively hydrogenated block copolymer wherein at least one acid compound or a derivative thereof is grafted to the block copolymer. Poly(alkylene terephthalates) are preferred thermoplastic polyesters. The block copolymer will comprise at least one polymeric block of a monoalkenyl arene and at least one polymeric block of at least one conjugated diolefin.

4 Claims, No Drawings

HIGH IMPACT RESISTANCT BLENDS OF THERMOPLASTIC POLYESTERS AND MODIFIED BLOCK COPOLYMERS

CROSS REFERENCE TO RELATED APPLICATIONS

This is a continuation of application Ser. No. 07/310,990, filed Feb. 17, 1989, which is a continuation-in-part of copending U.S. patent application Ser. No. 110,065, filed Oct. 15, 1987, which Application is, itself, a continuation-in-part of U.S. application Ser. No. 855,657, filed Jul. 31, 1985 all now abandoned.

BACKGROUND OF THE INVENTION

1. Field of Invention

This invention relates to a polymeric composition. More particularly, this invention relates to a thermoplastic polyester resin composition.

2. Prior Art

The use of thermoplastic polyesters such as the poly(alkylene terephthalates) in various applications is, of course, well known in the prior art. Such polymers are particularly useful in the preparation of molded structures. In general, the molded structures may be prepared via injection molding, compression molding, transfer molding and the like. Depending upon the particular end use, the thermoplastic polyester may be combined with other polymers, oils, fillers, reinforcing agents, antioxidants, stabilizers, fire retardants, antiblocking agents and the like.

In general, products fashioned with thermoplastic polyester resins exhibit good rigidity, heat resistance and electrical characteristics. The molded products do not, however, generally exhibit good impact resistance. As a result, polymeric compositions comprising a thermoplastic polyester as the sole polymeric component frequently cannot effectively be used in the preparation of many molded products. Moreover, the poor impact strength has, to some extent at least, restricted the use of such polymer compositions in other end use applications.

Heretofore, several techniques have been proposed for improving the impact resistance of shaped articles fashioned from a thermoplastic polyester. In general, these methods involve the incorporation of an elastomeric polymer into a polymeric composition comprising the thermoplastic polyester. In this regard, block copolymers comprising at least one monoalkenyl aromatic hydrocarbon polymer block and at least one conjugated diolefin polymer block are known to improve the impact strength of thermoplastic polyester resin composition products. Frequently, the conjugated diolefin block will be selectively hydrogenated so as to improve weatherability and heat resistance. The elastomeric block copolymer may be incorporated so as to form an interlocking network as taught in U.S. Pat. No. 4,101,605. The block copolymer may also, in effect, simply be admixed with the thermoplastic polyester as taught in U.S. Pat. No. 4,220,735. The block copolymer may further be modified by grafting an unsaturated carboxylic acid or a derivative thereof onto the block copolymer before physically admixing the same with the polyester as taught in U.S. Pat. No. 4,657,970 and International Kokai Application No. WO83/00492. The thermoplastic polyester resin compositions obtained via physical admixture of the components are, however, frequently, not stable and phase separation often occurs between the polyester and the block copolymer. Moreover, while the improvement in impact resistance realized with any of these systems may occasionally be significant, the improvement is more generally marginal and less significant. There is, of course, no known way to control these systems so as to insure a significant improvement in the impact resistance of the polyester composition.

It is, of course, known in the prior art that polymer compositions comprising an impact modifier will consist of at least two distinct phases-a first phase comprising the principle polymer and a second phase comprising the impact modifier. Heretofore, it has been believed that the interfacial adhesion between these two phases as well as the phase size of the second, impact modifier, phase were the principle variables affecting the extent of impact modification in such compositions. With any given polymer systems, there is, of course, little control over the interfacial adhesion between these phases although the amount of modifier actually used as well as the number of functional groups contained therein can be varied with some degree of accuracy. Similarly, there is little control over phase size of the second, impact modifier, phase although certain polymer properties believed to affect phase size such as molecular weight as well as the method used to prepare the polymeric blend can be varied with some degree of accuracy.

While, as indicated supra, the incorporation of an elastomeric block copolymer or a modified derivative thereof into a thermoplastic polyester resin composition frequently leads to the production of a product having improved impact strength, the extent of impact resistance improvement is, at best, difficult to control and, as a result, the amount of block copolymer, impact modifier, actually used or required to realize significant improvement is frequently relatively excessive. The improved impact resistance is, then, frequently obtained at the expense of other desirable properties characteristic of thermoplastic polyester resin products. Moreover, the selectively hydrogenated block copolymers are relatively expensive. As a result, even when the selectively hydrogenated block copolymers are used as a modifier in a thermoplastic polyester resin composition, they frequently are not used at a high enough concentration to yield a maximum impact strength. The need, then, for an improved impact modifiers which will be effective at lower concentrations, not subject to phase separation and affort better control over the extent of the impact improvement realized in thermoplastic polyester resin compositions is believed to be readily apparent.

SUMMARY OF THE INVENTION

It has now been discovered that the foregoing and other disadvantages of the prior art thermoplastic polyester resin compositions can be overcome or at least significantly reduced with the thermoplastic polyester compositions of this invention. It is, therefore, an object of the present invention to provide an improved thermoplastic polyester resin composition. It is another object of this invention to provide such an improved thermoplastic polyester resin composition comprising an impact modifier. It is still another object of this invention to provide such an improved thermoplastic polyester resin composition comprising an impact modifier wherein certain of the properties of the impact modifier are carefully controlled so as to insure that when the impact modifier is used at an effective concentration, the resulting thermoplastic polyester resin composition will exhibit a significant improvement in impact resistance. The foregoing and other objects and advantages will become apparent from the description, including the Examples contained therein, set forth hereinafter.

According to the present invention, there is provided a multiphase, impact resistant blend of a thermoplastic polyester and a thermally stable modified selectively hydrogenated block copolymer wherein at least one acid compound or a derivative of such an acid compound is grafted to or otherwise incorporated into the block copolymer. More particularly, there is provided a multiphase, impact resistant polymeric composition comprising (a) a first phase containing an effective amount, generally from about 50 to about 97 percent, by weight, based on the combined weight of first and second phase, of a thermoplastic polyester; and (b) a second phase containing an effective amount, generally, from about 3 to about 50 percent, by weight, based on combined weight of the first and second phase, of a functionalized selectively hydrogenated block copolymer comprising at least one polymeric block (A) containing predominantly monoalkenyl aromatic monomer units and at least one polymeric block (B) containing predominantly conjugated diolefin monomer units, which polymeric blocks (B) are subsequently hydrogenated, to which block copolymer has been grafted an acid compound or a derivative thereof and wherein, (1) each A block has an average molecular weight of about 2,000 to about 115,000;

(2) each B block has an average molecular weight of about 20,000 to about 450,000;

(3) the blocks A constituting 5–95 weight percent of the copolymer;

(4) the residual unsaturation of the blocks B is an amount which will be effective in enabling a significant improvement in impact resistance, generally within the range from about 5% to about 0% of the original unsaturation;

(5) the unsaturation of the A blocks is above about 50% of the original unsaturation;

(6) and substantially all of the acid compounds or their derivatives are grafted into the B blocks of the copolymer.

DETAILED DESCRIPTION OF THE INVENTION

Thermoplastic Polyesters

The thermoplastic polyesters employed in this invention have a generally crystalline structure, a melting point over about 120° C., and are thermoplastic as opposed to thermosetting. One particularly useful group of polyesters are those thermoplastic polyesters prepared by condensing a dicarboxylic acid or the lower alkyl ester, acid halide, or anhydride derivatives thereof with a glycol, according to methods well-known in the art.

The dicarboxylic acids may be aromatic and/or aliphatic. Among the aromatic and aliphatic dicarboxylic acids suitable for preparing polyesters useful in the present invention are oxalic acid, malonic acid, succinic acid, glutaric acid, adipic acid, suberic acid, azelaic acid, subacic acid, terephthalic acid, isophthalic acid, p-carboxyphenoacetic acid, p,p'-dicarboxydiphenyl, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p,p'-dicarboxydiphenylpropane, p,p'-dicarboxydiphenyloctane, 3-alkyl-4-($\beta$-carboxyethoxy)benzoic acid, 2,6-naphthalene dicarboxylic acid, 2,7-naphthalene dicarboxylic acid, and the like. Mixtures of dicarboxylic acids can also be employed.

The glycols suitable for preparing the polyesters useful in the present invention include straight chain alkylene glycols of 2 to 12 carbon atoms such as ethylene glycol, 1,3-propylene glycol, 1,6-hexylene glycol, 1,10-decamethylene glycol, 1,12-dodecamethylene glycol and the like. Aromatic glycols can be substituted in whole or in part. Suitable aromatic dihydroxy compounds include p-xylylene glycol, pyrocatechol, resorcinol, hydroquinone, or alkyl-substituted derivatives of these compounds. Another suitable glycol is 1,4-cyclohexane dimethanol. Much preferred glycols are the straight chain alkylene glycols having 2 to 4 carbon atoms.

A preferred group of polyesters are the poly(alkylene terephthalates), particularly the poly[lower alkylene ($C_2$–$C_4$) terephthalates], such as poly(ethylene terephthalate), PET; poly(propylene terephthalate), PPT; and poly(butylene terephthalate), PBT. A much preferred polyester is poly(butylene terephthalate). Poly(butylene terephthalate), a crystalline copolymer, may be formed by the polycondensation of 1,4-butanediol and dimethylterephthalate or terephthalic acid, and has the generalized formula:

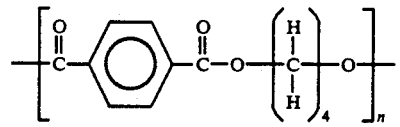

where n varies from 70 to 140. The molecular weight of the poly(butylene terephthalate) typically varies from about 20,000 to about 25,000. Suitable processes for manufacturing such polymers are disclosed in British Patent No. 1,305,130; and U.S. Pat. Nos. 2,465,395; 3,047,539 and 3,953,404, the disclosure of which patents are herein incorporated by reference. Commercially available poly(butylene terephthalate) is available from General Electric under the tradename VALOX ® thermoplastic polyester. Other commercial polymers include CELANEX ® from Celanese, TENITE ® from Eastman Kodak, and VITUF ® from Goodyear Chemical.

Other useful polyesters include the cellulosics. The thermoplastic cellulosic esters useful herein are widely used as molding, coating and film-forming materials and are well known. These materials include the soild thermoplastic forms of cellulose nitrate, cellulose acetate (e.g. cellulose diacetate, cellulose triacetate), cellulose butyrate, cellulose acetate butyrate, cellulose propionate, cellulose tridecanoate, carboxymethyl cellulose, ethyl cellulose, hydroxyethyl cellulose and acetylated hydroxyethyl cellulose as described on pages 25–28 of Modern Plastics Encyclopedia, 1971–72, and references listed therein.

Another useful polyester is polypivalolactone. Polypivalolactone is a linear polymer having recurring ester structural units mainly of the formula:

i.e., units derived from pivalolactone. Preferably, the polyester is a pivalolactone homopolymer. Also included, however, are the copolymers of pivalolactone with not more than 50 mole percent, preferably not more than 10 mole percent of other beta-propiolactones, such as beta-propiolactone, alpha, alpha-diethyl-beta-propiolactone and alpha-methyl-alpha-ethyl-beta-propiolactone. The term "beta-propiolactones" refers to beta-propiolactone (2-oxetanone) and to derivatives thereof which carry no substituents at the beta-carbon atom of the lactone ring. Preferred beta-propiolactones are those containing a tertiary or quaternary carbon atom in the alpha position relative to the carbonyl group. Especially preferred are the alpha, alpha-dialkyl-beta-propiolactones wherein each of the alkyl groups independently has from one to four carbon atoms. Examples of useful monomers are:
alpha-ethyl-alpha-methyl-beta-propiolactone,
alpha-methyl-alpha-isopropyl-beta-propiolactone,
alpha-ethyl-alpha-n-butyl-beta-propiolactone,
alpha-chloromethyl-alpha-methyl-beta-propiolactone,
 alpha,alpha-bis
(chloromethyl)-beta-propiolactone, and
alpha, alpha-dimethyl-beta-propiolactone (pivalolactone).

See generally U.S. Pat. Nos. 3,259,607; 3,299,171; and 3,579,489, the disclosure of which patents are herein incorporated by reference. These polypivalolactones have a molecular weight in excess of 20,000 and a melting point in excess of 120° C.

Another useful polyester is polycaprolactone. Typical poly($\epsilon$-caprolactones) are substantially linear polymers in which the repeating unit is

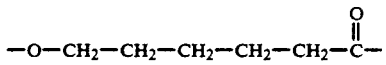

These polymers have similar properties to the polypivalolactones and may be prepared by a similar polymerization mechanism. See generally U.S. Pat. No. 3,259,607, the disclosure of which patent is herein incorporated by reference.

Linear and branched polyesters and copolyesters of glycols and terephthalic or isophthalic acid have been commercially available for a number of years and have been described by Whinfield et al in U.S. Pat. 2,465,319 and by Pengilly in U.S. Pat. 3,047,539.

Thermoplastic polyesters, of course, are useful as injection moldable materials which can be formed into articles which exhibit a good balance of properties including strength and stiffness. An improvement in impact strength of these materials is desirable, however, and a significant improvement therein is accomplished with the compositions of this invention.

SELECTIVELY HYDROGENATED BLOCK COPOLYMER

The selectively hydrogenated block copolymers which may be modified by grafting at least one acid compound or a derivative thereof and then employed in the compositions of the present invention may have a variety of geometrical structures, since the invention does not depend on any specific geometrical structure, but rather upon the chemical constitution of each of the polymer blocks, and subsequent modification of the block copolymer. The precursor of the selectively hydrogenated block copolymers employed in the compositions of the present composition are preferably thermoplastic elastomers and have at least one alkenyl arene polymer block A and at least one elastomeric conjugated diene polymer block B. The number of blocks in the block copolymer is not of special importance and the macromolecular configuration may be linear or branched, which includes graft, radial or star configurations, depending upon the method by which the block copolymer is formed.

Typical examples of the various structures of the precursor block copolymers used in the present invention are represented as follow:

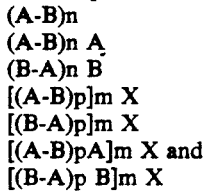

wherein A is a polymer block of an alkenyl arene, B is a polymer block of a conjugated diene, X is a residual group of a polyfunctional coupling agent having two or more functional groups, n and p are, independently, integers of 1 to 20 and m is an integer of 2 to 40. Furthermore, the above-mentioned branched configurations may be either symmetrical or asymmetrical with respect to the blocks radiating from X.

It will be understood that both blocks A and B may be either homopolymer, random or tapered copolymer blocks as long as each block at least predominates in at least one class of the monomers characterizing the blocks defined hereinbefore. For example, blocks A may comprise styrene/alphamethylstyrene copolymer blocks or styrene/butadiene random or tapered copolymer blocks as long as the blocks individually at least predominate in alkenyl arenes. The A blocks are preferably monoalkenyl arene. The term "monoalkenyl arene" will be taken to include particularly those of the benzene series such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred monoalkenyl arenes are monovinyl monocyclic arenes such as styrene and alpha-methylstyrene, and styrene is particularly preferred.

The blocks B may comprise homopolymers of conjugated diene monomers, copolymers of two or more conjugated dienes, and copolymers of one of the dienes with a monoalkenyl arene as long as the blocks B at least predominate in conjugated diene units. The conjugated dienes are preferably ones containing from 4 to 8 carbon atoms. Examples of such suitable conjugated diene monomers include: 1,3-butadiene (butadiene), 2-methyl-1,3-butadiene (isoprene), 2,3-dimethyl-1,3-butadiene, 1,3-pentadiene (piperylene), 1,3-hexadiene, and the like. Mixtures of such conjugated dienes may also be used. The preferred conjugated dienes are butadiene and isoprene.

Preferably, the block copolymers of conjugated dienes and alkenyl arene hydrocarbons which may be utilized in the compositions of this invention include any of those which are low in modulus relative to the particular polyester or polyesters used in the composition, preferably less than 1:10 (ratio of tensile modulus of block copolymer to tensile modulus of polyester) and those butadiene derived elastomers which have 1,2-microstructure contents prior to hydrogenation of from about 7 to about 100 percent, preferably from about 25 to about 65 percent, more preferably from about 35 to about 55 percent. Such block copolymers may contain various ratios of conjugated dienes to alkenyl arenes. The proportion of the alkenyl arene blocks is between about 1 and about 99 percent by weight of the multiblock copolymer, preferably between about 2 and about 60 percent, more preferably between about 10 and about 55 percent by weight and particularly preferably between about 15 and about 40 percent by weight. When the alkenyl arene content is not more than about 60 percent by weight, preferably not more than about 55 percent by weight, the precursor block copolymer has characteristics of a rubbery (soft) polymer; and when the alkenyl arene content is greater than about 60 percent by weight, preferably more than about 70 percent by weight, the precursor block copolymer has characteristics as a resinous polymer.

The average molecular weights of the individual blocks may vary within certain limits. In most instances, the monoalkenyl arene blocks will have weight average molecular weights in the order of about 2,000 to about 115,000, preferably about 5,000 to about 60,000, while the conjugated diene blocks either before or after hydrogenation will have weight average molecular weights on the order of about 20,000 to about 450,000, preferably about 25,000 to about 150,000. The total weight average molecular weight of the multiblock copolymer is typically in the order of about 7,000 to about 700,000, preferably from about 12,000 to about 270,000. These molecular weights are most accurately determined by gel permeation chromatography.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627, the disclosures of which are incorporated herein by reference. As is well known in the block copolymer art, tapered copolymer blocks can be incorporated in the multiblock copolymer by copolymerizing a mixture of conjugated diene and alkenyl arene monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356, the disclosures of which are incorporated herein by reference.

Though the afore-mentioned illustrative patents are slanted to producing network forming block copolymers (e.g. A-B-A), the non-network forming block copolymers useful in the compositions of the present invention may be prepared by an obvious variation or modification of these procedures; for example, 1) sequential polymerization of an A-B or B-A-B block copolymer; 2) utilizing a di-initiator to prepare a B-A-B block copolymer; 3) utilizing polyfunctional coupling agents to couple B-A-Li living copolymer segments to form a $(B-A)_n X$ polymer, where X is the residual portion of the polyfunctional coupling agent incorporated as part of the polymer whose presence therein is of insignificant effect to the properties of the resulting polymer and where n is the number of block copolymer segments or arms attached to X; and 4) similarly utilizing polyfunctional coupling agents to couple B-A-Li living copolymer segments and B-Li living homopolymer or diene copolymer segments to form a $(B-A)_y X (B)_z$ polymer, where X is as before and y and z represent the number of respective segments or arms attached to X.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

The precursor block polymers will be selectively hydrogenated to bring the residual ethylenic unsaturation within the effective range required to produce a polyester resin composition having a significantly improved impact resistance and to increase their thermal stability and resistance to oxidation. The hydrogenation of these polymers and copolymers may be carried out by a variety of well established processes including hydrogenation in the presence of such catalysts as Raney Nickel, noble metals such as platinum, palladium and the like, and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. Re. 27,145; 3,113,986; 3,700,633; 3,700,748; 3,763,044; 3,772,196; 3,965,019; 4,036,910; and 4,226,952, the disclosures of which are incorporated herein by reference. The polymers and copolymers are hydrogenated in such a manner as to produce hydrogenated polymers and copolymers having a residual ethylenic unsaturation content in the polydiene blocks of not more than about 5 percent, preferably less than about 2 percent of their original ethylenic unsaturation content prior to hydrogenation.

GRAFTED COMPOUNDS

In general, any acid compound or derivative thereof having the ability to react with the selectively hydrogenated polymer, in free radical initiated reactions are operable for the purposes of the invention. In order to incorporate acid or acid derivative functional groups into the selectively hydrogenated polymer, monomers capable of reacting with the polymer, for example, in solution or in the melt by free radical mechanism are necessary. The monomers may be polymerizable or nonpolymerizable, however, preferred monomers are nonpolymerizable or slowly polymerizing.

The monomers must be ethylenically unsaturated in order to take part in free radical reactions. We have found that by grafting unsaturated monomers which have a slow polymerization rate the resulting graft copolymers contain little or no homopolymer of the unsaturated monomer and contain only short grafted monomer chains which do not phase separate into separate domains.

The class of preferred monomers which will form graft polymers within the scope of the present invention have one or more functional groups or their derivatives such as carboxylic acid groups and their salts, anhydrides, esters, imide groups, amide groups, acid chlorides and the like in addition to at least one point of unsaturation. At least certain of these functionalities can be subsequently reacted with other modifying materials to produce new or different functional groups. For example a graft of an acid-containing monomer could be suitably modified by esterifying the resulting acid groups in the graft with appropriate reaction with hydroxy-containing compounds of varying carbon atoms lengths. The reaction could take place simultaneously with the grafting or in a subsequent post modification reaction. The grafted polymer will usually contain an effective amount, generally, from 0.02 to 20, preferably 0.1 to 10, and most preferably 0.2 to 5 weight percent of grafted portion.

The preferred modifying monomers are unsaturated mono- and polycarboxylic-containing acids ($C_3$–$C_{10}$) with preferably at least one olefinic unsaturation, and anhydrides, salts, esters, ethers, amides, nitriles, thiols, thioacids, glycidyl, cyano, hydroxy, glycol, and other substituted derivatives said acids. Examples of such acids, anhydrides and derivatives thereof include maleic acid, fumaric acid, itaconic acid, citraconic acid, acrylic acid, glycidyl acrylate, cyanoacrylates, hydroxy $C_1$–$C_{20}$ alkyl methacrylates, acrylic polyethers, acrylic anhydride, methacrylic acid, crotonic acid, isocrotonic acid, mesaconic acid, angelic acid, maleic anhydride, itaconic anhydride, citraconic anhydride, acrylonitrile, methacrylonitrile, sodium acrylate, calcium acrylate, and magnesium acrylate.

Other monomers which can be used either by themselves or in combination with one or more of the carboxylic acids or derivatives thereof include $C_2$–$C_{50}$ vinyl monomers such as acrylamide, acrylonitrile and monovinyl aromatic compounds, i.e. styrene, chlorostyrenes, bromostyrenes, α-methyl styrene, vinyl pyridines and the like. Still other monomers which can be used are $C_4$ to $C_{50}$ vinyl esters, vinyl ethers and allyl esters, such as vinyl butyrate, vinyl laurate, vinyl stearate, vinyl adipate and the like, and monomers having two or more vinyl groups, such as divinyl benzene, ethylene dimethacrylate, triallyl phosphite, dialkylcyanurate and triallyl cyanurate.

The most preferred monomers to be grafted to the block copolymers according to the present invention are maleic anhydride, maleic acid, fumaric acid and their derivatives. It is well known in the art that these monomers do not polymerize easily. Of course, mixtures of monomer can be also added so as to achieve graft copolymers in which the graft chains contain at least two different monomers therein (in addition to the base polymer monomers).

PREPARATION OF THE MODIFIED (FUNCTIONALIZED) POLYMERS

The modified block copolymer for blending according to the present invention may be prepared by any convenient manner. Preferably, the polymer is prepared such that at least one modifier selected from the group consisting of unsaturated carboxylic acids and derivatives thereof is grafted onto the selectively hydrogenated conjugated diene portion of the polymer via a free radically initiated reaction. The graft reaction may be carried out by solution or melt-mixing the selectively hydrogenated block copolymer and the unsaturated carboxylic acid (and/or derivative thereof) in the presence of a free radical initiator. Disclosures for such processes are found in U.S. Pat. Nos. 4,033,888; 4,077,893; and 4,670,173 for solution processes and in U.S. Pat. Nos. 4,427,828; 4,578,429; 4,628,072; and 4,657,971 for melt-mixing processes.

The grafting reaction is initiated by a free-radical initiator which is preferably a peroxy compound and more preferably an organic peroxide compound. Preferred organic peroxides include benzoyl peroxide, 2,5-dimethyl-2,5-di(t-butylperoxy)hexane, di-t-butyl peroxide, 2,5-dimethyl-2,5-di-tert-butylperoxy-3-hexyne (Lupersol 130), α,α'-bis(tert-butylperoxy)diisopropyl benzene (VulCup R), or any free radical initiator having a convenient (short) half-life under the base polymer processing conditions. Additionally, in the solution process, the free radical initiator is preferably soluble in the reaction mixture. See pp. 66–67 of *Modern Plastics*, November 1971, for a more complete list of such compounds. Mixtures of two or more of the above peroxides may also be used.

The concentration of the initiator used to prepare the polymer may also vary between wide limits and is determined by the desired degree of functionalization of the polymer, the reaction temperature and degradation allowable. In a solution process, typical concentrations based on polymer content range from about 0.001 to 50.0 weight percent, more preferably, between 0.1 and 5.0 weight percent. In a melt-mixing process, typical concentration based on polymer content range from about 0.001 to about 5.0 weight percent, more preferably from about 0.01 to about 1.0 weight percent.

Reaction temperatures and pressures should be sufficient to thermally decompose the free radical initiator to form the free radical. Additionally, in a solvent free melt-mix process, the reaction conditions should be sufficient to melt the reactants. As such, the reaction temperatures would depend on the base polymer and the free radical initiator being used.

In a solution process, the temperature at which the reaction is carried out may vary within wide limits such as from about 0° C. to about 300° C., preferably from about 20° C. to about 200° C. The reaction may be carried out in an inert atmosphere, such as nitrogen, and may be carried out under pressure depending upon the vapor pressure of the solvent used at the selected reaction conditions. Typical reaction conditions such as these may be obtained by using, for example, an autoclave-type reactor to heat the reactant mixture to the desired reaction temperature.

The solvents that may be used in this solution process are preferably inert liquid solvents such as hydrocarbons, e.g., aliphatic and aromatic hydrocarbons. Suitable aliphatic hydrocarbon solvents include, but are not limited to, pentane, hexane, heptane, octane, 2-ethylhexane, nonane, decane, cyclohexane and methylcyclohexane. Suitable aromatic hydrocarbon solvents include, but are not limited to, benzene, toluene, ethylbenzene, the xylenes, diethylbenzenes, and propylbenzenes. Mixtures of hydrocarbons, e.g., lubricating oil, may also be utilized.

In a melt-mixing process, the temperatures useful in the reaction of this process, may also vary within wide limits such as from about 75° C. to about 450° C., preferably from about 200° C. to about 300° C. Typical reaction conditions such as these may be obtained by using a screw type extruder to mix and melt the reactants and to heat the reactant mixture to the desired reaction temperature. Additionally, flow promoters such as oils, low molecular weight resins, or other polymers may be included in the reaction mixture during the functionalization step.

After functionalization has been completed, it is advantageous to remove any excess, unreacted functionalizing agent since these free reagents could compete with functionalizing groups incorporated into the block copolymer for reaction with reactive functional groups contained in the polyester or polyesters and thereby reduce the overall performances of the polyester resin composition containing the modified block copolymer. Such separation may, of course, be accomplished using methods well known in the prior art such as those described in the above-cited patents.

The functionalization utilized herein is highly flexible and a great many modifications such as those proposed above are available to carry out any particular purpose desired.

Of course, any of the standard additives can be used with these modified polymers. They include conventional heat stabilizers, slip-agents, antioxidants, antistatic agents, colorants, flame retardants, heat stabilizers, plasticizers, preservatives, processing aids and the like.

PREPARATION OF THE FINAL COMPOSITIONS

The toughened compositions of this invention can be conveniently prepared by melt blending, in a closed system, one or more thermoplastic polyesters and at least one modified selectively hydrogenated block copolymer into a uniform mixture in a multi-screw extruder, such as a Werner Pfleiderer extruder having generally 2-5 kneading blocks and at least one reverse pitch to generate high shear, or other conventional plasticating devices such as a Brabender, Banbury mill, or the like. Alternatively, the blends may be made by coprecipitation from solution or by dry mixing together of the components followed by melt fabrication of the dry mixture by extrusion.

The polyester blends of the present invention may be prepared by blending an effective amount, generally, from about 50 percent to about 97 percent, by weight, based on total weight of polyester and block copolymer, preferably from about 70 percent to about 95 percent, most preferably from about 70 percent to about 90 percent of the polyester and an effective amount, generally, from about 3 percent to about 50 percent by weight, based on total weight of polyester and block copolymer, preferably from about 5 percent to about 30 percent or more preferably 10 percent to about 30 percent of modified functionalized, block copolymer. The modified block copolymer will contain an effective amount of one or more carboxylic acid functional groups or derivatives thereof and an effective amount of residual unsaturation.

As used herein, the recitation "effective amount" shall mean that amount required to yield a thermoplastic polyester resin composition, which when used, will provide a significantly improved impact resistance. For purposes of this invention, the impact resistance will be significantly improved when an injection molded test specimen prepared with the thermoplastic polyester resin composition has a notched Izod at room temperature, as determined using ASTM D-256, of at least 10 ft. lb./in. (about 54 Kg-cm/cm) and the specimen experiences ductile (sample hinges but does not break), as opposed to brittle (sample breaks), failure. For convenience, compositions exhibiting significantly improved impact resistance will sometime be referred to herein as "super-tough" or "super-toughened" compositions.

Interestingly, the effective amount of polyester, the effective amount of modified block copolymer and the effective amount of carboxylic acid or carboxylic acid derivative functionality incorporated into the block copolymer are independent of all other variables in the system. The effect amount of block copolymer will, however, vary with the amount of functional groups grafted thereon. An effective amount of block copolymer will, then, be less at higher functional group concentrations therein and higher at lower functional group concentrations therein. The effective amount of block copolymer and the effective amount of functionality in the block copolymer are, to some extent, then, interdependent. The effective amount of residual ethylenic unsaturation contained in the modified block copolymer may vary somewhat with the molecular weight of the alcohol condensed in preparing the polyester or the alkylene group when the polyester is a poly(alkylene terephthalate). This, then, could afford a method by which super-tough polyester resin compositions could be obtained with any given combination of polymers simply by varying the residual unsaturation of the block copolymer as a function of the alcohol molecular weight.

The effective amount of modified block copolymer required to produce a super-tough polyester resin composition also appears to vary with the molecular weight of the polyester used in the composition with less modified block copolymer being required with higher molecular weight polyesters and more modified block copolymer required with lower molecular weight polyesters. This too, then, affords a method by which super-tough polyester resin compositions may be obtained with any given combination of polymers. For example, if one does not initially obtain a super-tough polyester resin composition with a given combination of polymers, either increasing the molecular weight of the polyester or increasing the amount of modified block copolymer should ultimately result in a super-tough polyester resin composition.

The compositions of the present invention may be modified by one or more conventional additives such as stabilizers and inhibitors of oxidative, thermal, and ultraviolet light degradation; lubricants and mold release agents, colorants including dyes and pigments, fibrous and particulate fillers and reinforcements, nucleating agents, plasticizers, etc.

The stabilizers, when used, can be incorporated into the composition at any stage in the preparation of the thermoplastic composition. Preferably the stabilizers, when used, will be incorporated early to preclude the initiation of degradation before the composition can be protected. Such stabilizers must be compatible with the composition.

It is to be understood that in the specification and claims herein, unless otherwise indicated, when in connection with melt-blending, the amount of the polyester or block copolymer is expressed in terms of percent by weight it is meant percent by weight based on the total amount of these materials which is employed in the melt-blending.

The polyester resin compositions of this invention are useful for any of the purposes known in the prior art, generally, for polyester resin compositions, particular for the preparation of molded articles or structures. Molded articles or structures prepared with the polyester resin compositions of this invention will exhibit significantly improved impact resistance and will, therefore, be super-tough.

PREFERRED EMBODIMENT OF THE INVENTION

In a preferred embodiment of this invention, a polyester resin composition will be prepared by blending a poly (alkylene terephthalate), most preferably a poly(butylene terephthalate), with a network forming block copolymer having the general formula: $(A-B)_n-A$; wherein each A is a polymer block of one or more alkenyl arenes, each B is a polymer block of one or more selectively hydrogenated conjugated dienes, and n is a number from 1 to 5. Most preferably, the block copolymer will be a triblock copolymer wherein n=1. In both the preferred and most preferred embodiments, the A blocks will have a weight average molecular weight within the range from about 5,000 to about 60,000 and the B blocks will have a weight average molecular weight within the range from about 25,000 to about 150,000. In the preferred embodiment, the block copolymer will be selectively hydrogenated such that the residual ethylenic unsaturation is within the range from about 2 to about 0% of the original ethylenic unsaturation contained in the unhydrogenated polymer. The preferred polyester resin composition will contain from about 70 to about 95 wt % polyester and from about 5 to about 30 wt % block copolymer while the most preferred polyester composition will contain from about 70 to about 90 wt % polyester and from about 10 to about 30 wt % block copolymer. In the preferred embodiment, the block copolymer will be modified by grafting from about 0.1 to about 10 wt %, based on weight of block copolymer, of a mono- or polycarboxylic acid having from 3 to 10 carbon atoms or a derivative thereof. In the most preferred embodiment, the block copolymer will be modified by grafting from about 0.2 to about 5 wt %, based on block copolymer of a compound selected from the group consisting of maleic acid, fumaric acid and derivatives thereof.

Having thus broadly described the present invention and a preferred and most preferred embodiment thereof, it is believed that the invention will become even more apparent by reference to the following examples. It will be appreciated, however, that the examples are presented solely for purposes of illustration and should not be construed at limiting the invention. In the examples, parts and percentages are by weight unless otherwise specifically noted. The molded bars were tested using the following test procedures in the dry-as-molded state:

Notched Izod toughness: at each end ASTM D-256-56
Flexural Modulus: ASTM D-790-58T
Heat Distortion Temperature: ASTM D-648

EXAMPLE 1

In this Example, five modified triblock copolymers having different levels of functionality were prepared and then blended with a commercially available poly(butylene terephthalate) at different concentrations in an effort to evaluate the interdependence between the level of functionality of the modified block copolymer and its concentration in the polyester resin composition with respect to their affect on the Notched Izod property of the resulting blend. Each of the five modified block copolymers were prepared by grafting different amounts of maleic anhydride onto a selectively hydrogenated A-B-A triblock copolymer with the triblock copolymer in the molten phase and in the presence of a free radical initiator; viz., 2,5-dimethyl-2,5-di(t-butylperoxy) hexane. In preparing each of the modified block copolymers, the same A-B-A triblock copolymer wherein each A was a polystyrene block having a weight-average molecular weight of about 7,200 and B was a selectively hydrogenated polybutadiene block having a weight-average molecular weight of about 35,000 was used. Each of the modified block copolymers was prepared by combining the maleic anhydride, the free radical initiator and the unmodified block copolymer in a 30 mm diameter corotating twin screw extruder. The residual ethylenic unsaturation in the triblock copolymer was less than 1% as determined by ozone titration. In preparing each of the modified block copolymers, either the extruder conditions used or the amount of maleic anhydride used was varied so as to vary the amount of maleic anhydride incorporated into the polymer. In each run, the melt temperature varied from about 150° C. in the feed zone to about 260° C. at the die. After preparation of the modified block copolymers excess maleic anhydride was separated and the polymers then analyzed using colorometric titration with potassium methoxide and phenol phthalein indicator to determine the amount of maleic anhydride grafted thereon. One of the polymers, hereinafter referred to as block copolymer A, contained 0.2 wt % maleic anhydride; a second polymer, hereinafter referred to as block copolymer B, contained 0.8 wt % maleic anhydride, a third of the polymers, hereinafter referred as block copolymer C, contained 1.6 wt % maleic anhydride a fourth of the polymers, hereinafter referred to as block copolymer D, contained 2.6 wt % maleic anhydride; and the fifth, hereinafter referred to as block copolymer E, contained 4.6 wt % maleic anhydride. In an effort to evaluate the effect of the amount of functionality incorporated into the block copolymer and its concentration in a polyester resin composition, portions of each of the block copolymers prepared in this Example were combined with a commercially available poly(butylene terephthalate), Valox 310 from General Electric Company, at different concentrations. Portions of each blend were then shaped (molded) into ⅛-in. bars suitable for determining notched Izod values using ASTM D-256 and the notched Izod values determined at room temperature. Prior to preparing the polyester resin compositions, the modified block copolymers were dried until water could not be detected via IR. In preparing the blends, the polymeric components were first dry blended via tumbling and the dry blend then passed through a corotating twin screw extruder. In preparing the blends, the extruder temperature profile varied from 230° C. in the feed zone to 240° C. at the die. A stabilizer package comprising a phosphite and a hindered phenol in a 3:1 ratio was incorporated into each of the polyester resin composition at a concentration 0.5 wt % during preparation.

For purposes of comparison, polyester resin compositions, prepared in a manner identical to that summarized above, comprising the same commercially available poly(butylene terephthalate) alone and the same poly(butylene terephthalate) in combination with an unmodified block copolymer at different concentrations were tested. The unmodified block copolymer was identical to that used to prepare the modified block copolymers.

In addition to determining the notched Izod values at room temperature for all samples, the Flexural Modulus using ASTM D-790-58T and the Heat Distortion Temperature using ASTM D-648 were determined for certain of the samples. The composition of all samples tested, a number designating the sample and the results obtained therewith are sumamrized in the following Table:

| Sample No. | COMPOSITION (PARTS BY WEIGHT) | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Poly(butylene terephthalate) | 70 | 80 | 75 | 70 | 90 | 80 | 70 | 80 | 75 | 70 | 80 | 100 | 90 | 80 | 70 |
| Block Copolymer A | 30 | | | | | | | | | | | | | | |
| Block Copolymer B | | 20 | 25 | 30 | | | | | | | | | | | |
| Block Copolymer C | | | | | 10 | 20 | 30 | | | | | | | | |
| Block Copolymer D | | | | | | | | 20 | 25 | 30 | | | | | |
| Block Copolymer E | | | | | | | | | | | 20 | | | | |
| Unmodified Block Copolymer | | | | | | | | | | | | | 10 | 20 | 30 |
| ⅛" Notched Izod, Room Temp. (Ft. lb./in.) | 4.4 | 4.1/ 4.3 | 5.2/ 18.4 | 18.5/ 18.4 | 2.2 | 2.9 | 17.8 | 4.3/ 4.3 | 18.9/ 18.5 | 20.3/ 19.5 | 15.4/ 4.8 | 0.7 | 1.0 | 1.5 | 2.1 |
| Flexural Modulus (1000 psi) | | 276 | | 225 | 306 | 251 | 215 | 265 | | 182 | | 342 | | | |
| Heat Distortion Temperature @ 264 psi (°C.) | | | | | 52 | 51 | 49 | | | | | 56 | | | |

*The first value given for notched Izod (when two values are given) is the value for a test specimen taken close to the mold gate and the second value is for a test specimen taken at or near the dead end of the mold.

The above examples show that the compositions according to this invention, Samples 3, 4, 7, 9, 10 and 11 exhibit a significant improvement in impact strength over the thermoplastic polyester (Sample 12) or blends of the thermoplastic polyester and unmodified block copolymer (Samples 13–15). In addition, the compositions according to the invention exhibit a good balance of toughness over a wide temperature range and desirable low strain properties such as modulus and heat distortion temperature. The compositions of Samples 1, 2, 5, 6 and 8 also exhibited improved impact strength, but were not super-tough since these compositions did not contain an effective amount of a block copolymer having an effective amount of functionality contained therein. It should be noted, however, that these compositions could be made super-tough by increasing the amount of functionality contained in the block copolymer. Also, Samples 3 and 11 were not super-tough over the entire range of the test specimen. This indicates that these samples are near the ductile/brittle failure transition for the notched Izod test and, therefore, only minor adjustments in the amount of block copolymer and/or the amount of functionality therein are needed to make these samples perform satisfactorily.

EXAMPLE 2

In this Example, an A-B-A triblock copolymer, wherein each A was a polystyrene block having a weight-average molecular weight of about 7,200 and B was a polybutadiene block having a weight average molecular weight of about 35,000, was selectively hydrogenated to different levels of residual ethylenic unsaturation, extruder grafted with maleic anhydride and then used as an impact modifier in a thermoplastic polyester resin composition in an effort to evaluate the affect of residual ethylenic unsaturation on the block copolymers performance as an impact modifier. The selective hydrogenation was accomplished in the presence of a catalyst prepared by combining nickel-2-ethylhexanoate and triethyl aluminum using techniques well known in the prior art. Reaction of the selectively hydrogenated triblock copolymer with maleic anhydride was accomplished in the same manner as is summarized in Example 1, although an attempt was made to incorporate the same amount of maleic anhydride in each of the triblock copolymers modified in this Example. As indicated infra, however, this effort was not completely successful. The amount of residual ethylenic unsaturation contained in the polymer was determined using an ozone titration method well known in the prior art. The amount of maleic anhydride grafted into or on the triblock copolymer was determined in the same manner as is summarized in Example 1. Portions of each of the polymers, produce in this Example was, ultimately, combined with a poly(butylene terephthalate) identical to that used in preparing the polyester resin compositions in Example 1. In fact, the polyester resin compositions prepared and tested in this Example were prepared in the same manner as was used in Example 1, including the incorporation of a stabilizer package, but different equipment was used. For example, certain of the compositions were prepared with a Werner Pfleiderer (WP) 33 mm corotating extruder and the remainder prepared with a Haake 30 mm twin screw extruder. The polyester and the functionalized triblock copolymer were, however, combined in a weight ratio of 70:30 in each of the polyester resin compositions prepared in this Example. After the polyester resin compositions were prepared, at least a portion thereof was injection molded to form ⅛" bars in the same manner as was used in Example 1. The notched Izod values at room temperature were than determined on a test piece formed close to the mold gate and a test piece formed close to the dead end of the mold. The results actually obtained, a sample number for each composition prepared in this Example, the amount of maleic anhydride and the residual unsaturation (RU) contained in the functionalized triblock copolymer are summarized in the following Table. In the column headed "notched Izod", the first value given is for the test piece formed close to the gate and the second value given is for the test piece formed close to the dead end of the mold.

| Sample No. | RU, % | Maleic Anhydride, wt % | 1" Notched Izod, ft. lb./in. |
| --- | --- | --- | --- |
| 16 | 12.7 | 2.0 | 1.8/1.7 |
| 17 | 12.7 | 2.1 | 1.3/1.1 |
| 18 | 8.1 | 2.4 | 2.0/2.2 |
| 19 | 7.1 | 2.2 | 2.3/2.5 |
| 20 | 4.7 | 2.5 | 4.1/3.8 |
| 21 | 2.8 | 1.9 | 7.6/16.4 |
| 22 | 0.7 | 1.3 | 16.5/17.9 |
| 23 | 0.7 | 1.2 | 14.2/12.7 |
| 24 | 0.7 | 1.7 | 20.7/19.5 |

As will be apparent from the data summarized in the preceding Table, those polyester resin compositions prepared with a functionalized triblock copolymer containing an 0.7% RU (Samples 16-18) were clearly super-tough across the full test specimen. If these data were plotted, it would appear that super-tough compositions across the full test specimen breaks at about 2% RU. The composition prepared with a functionalized block copolymer containing 2.8% RU was at least partly super-tough and the composition prepared with a functionalized block copolymer contain 4.7% RU were significantly better than those prepared with functionalized block copolymers containing higher percentages of RU. All of these results would be expected to improve if the amount of maleic anhydride incorporated into the block copolymer were increased. Similarly, the results should improve if the amount of block copolymer, with the amount of maleic anhydride actually tested, in the composition were increased. Moreover, there is reason to believe that the results would be improved if the molecular weight of the polyester used in the composition were increased.

EXAMPLE 3

In this Example, polyester resin compositions were prepared with three different functionalized block copolymers or block copolymer blends in an effort to evaluate, inter alia, the effect of the modifier molecular weight, or viscosity/elasticity in the case of the block copolymer blend, as well as the composition thereof. Three polyester resin compositions were prepared with each modifier with the amount of polyester and modifier different in each of the three compositions. In all of the polyester resin compositions prepared in this Example, a poly(butylene terephthalate) identical to that used in Examples 1 and 2 was used. In the first set of polyester resin compositions prepared in this Example, hereinafter referred to as Sample Nos. 25, 26 and 27, an A-B diblock copolymer, hereinafter referred to as block copolymer F, wherein each A was a polystyrene block having a weight average molecular weight of about 36,000 and B was a selectively hydrogenated polyisoprene block having a weight average molecular weight of about 59,000 was used. In the second set of polyester resin compositions prepared in this Example, hereinafter referred to as Sample No. 28, 29 and 30, a polymeric blend comprising 30 wt. % of an A-B-A triblock and 70 wt. % of an A-B' diblock copolymer, hereinafter referred to as Polymer Blend A, wherein each A was a polystyrene block having a weight average molecular weight of about 7,200, B was a selectively hydrogenated polybutadiene block having a weight average molecular weight of about 33,000 was used and B' was a selectively hydrogenated polybutadiene having a weight average molecular weight of 16,500. In the third set of polyester resin compositions prepared in this Example, hereinafter referred to as Sample Nos. 31, 32 and 33, a polymeric blend, hereinafter referred as blend B, comprising about 70 wt. % of an A-B-A triblock copolymer, wherein each A was a polystyrene block having a weight average molecular weight of about 5,300 and B was a selectively hydrogenated polybutadiene block having a weight average molecular weight of about 73,000, and about 30 wt. % of an A-B' diblock copolymer, wherein A was a polystyrene block having a weight average molecular weight of about 5,300 and B' was a selectively hydrogenated polybutadiene block having a weight average molecular weight of about 37,000, was used. Each of the block copolymers used in the several polyester resin compositions prepared in this Example had been selectively hydrogenated to a residual ethylenic unsaturation less than about 1.0% as determined by ozone titration. The block copolymer used in the first set of polyester resin compositions contained about 0.8 wt. % (based on block copolymer) of grafted maleic anhydride. The block copolymer used in the second set of polyester resin compositions contained about 0.6 wt. % of grafted maleic anhydride. The block copolymer blend used in the third set of polyester resin compositions contained about 1.0 wt. % of grafted maleic anhydride. In each case, the maleic anhydride was incorporated into the polymer using techniques identical to those used in Examples 1 and 2 and the amount of maleic anhydride contained in the polymers was determined in the same manner. Also, the polyester resin compositions were prepared in the same manner as was used in Examples 1 and 2. After preparation of the polyester resin compositions, the notched Izod values were determined on two test specimens in the same manner as was used in Example 2 and the flexural modulus was determined on certain of the Samples using the same method as was used in Examples 1 and 2. The results obtained with each sample are summarized in the following table. In the column head "1" notched Izod" the first value given is for a test specimen taken close to the mold gate while the second value is for a test specimen taken close to the dead end of the mold.

| | COMPOSITION (PARTS BY WEIGHT) | | | | | | | | |
| --- | --- | --- | --- | --- | --- | --- | --- | --- | --- |
| Sample No. | 25 | 26 | 27 | 28 | 29 | 30 | 31 | 32 | 33 |
| Poly(butylene terephthalate) | 80 | 75 | 70 | 80 | 75 | 70 | 80 | 75 | 70 |
| Block Copolymer F | 20 | 25 | 30 | | | | | | |
| Blend A | | | | 20 | 25 | 30 | | | |
| Blend B | | | | | | | 20 | 25 | 30 |
| 1" Notched Izod, | 3.0/ | 3.4/ | 3.3/ | 5.9/ | 5.5/ | 12.3/ | 9.7/ | 18.3/ | 13.8/ |
| Room Temperature (ft. lb./in.) | 4.0 | 4.3 | 4.2 | 15.1 | 17.8 | 12.3 | 18.6 | 18.7 | 12.3 |
| Flexural Modulus (1000 psi) | 285 | | 245 | 251 | | | 250 | 212 | |

EXAMPLE 4

In this Example, four polyester resin compositions were prepared using a commercially available poly- (ethylene terephthalate), Goodyear's Cleartuf®, a polyester having an IV of 0.72, and a functionalized A-B-A triblock copolymer, wherein each A was a polystyrene block having a weight average molecular weight of about 7,200 and B was a polybutadiene block having a weight average molecular weight of about 35,000, at different concentrations of each polymer. The A-B-A triblock copolymer was modified or functionalized by grafting 1.9 wt. maleic anhydride thereto using the same techniques as summarized in Examples 1-3. The A-B-A triblock copolymer used in each of the polyester resin compositions contained a residual ethylenic unsaturation of less than 1% of the amount of ethylenic unsaturation originally contained in the polymer. The polyester resin compositions were prepared in the same manner as summarized in Example 1 including the incorporation of a stabilizer package identical to that used in Example 1. After the polyester resin compositions were prepared, a portion of each was shaped into ⅛" bars and the notched Izod value thereof determined in the same manner as was used in Example 1. Also, the Flexural Modulus of certain of shaped specimen was determined. The amount of functionalized A-B-A triblock copolymer incorporated into each of the polyester resin compositions, a sample number assigned to each composition and the results obtained are summarized in the following Table.

| Sample No. | Modified Block Copolymer, wt % | Notched Izod, Room Temperature (Ft. lb./in.) | Flexural Modulus (1000 psi) |
|---|---|---|---|
| 34 | 5 | 1.1 | — |
| 35 | 10 | 1.6 | 293 |
| 36 | 20 | 13.1 | 248 |
| 37 | 30 | 19.0 | 222 |

As will be apparent from the data summarized in the preceding Table, the polyester resin compositions containing 20 and 30 wt. % of the modified block copolymer were super-tough.

EXAMPLE 5

In this Example, three polyester resin compositions were prepared and tested to evaluate the effect of the molecular weight (viscosity) of the polyester on the notched Izod value at room temperature of ⅛" bars molded with the composition. Each of the polyester resin compositions prepared in this Example contained 80 wt. % of the polyester and 20 wt. % of a modified A-B-A triblock copolymer identical to copolymer used in Example 4. In the first of the three polyester resin compositions, hereinafter referred to as Sample No. 38, a commercially available poly(ethylene terephthalate) having an intrinsic viscosity (IV) of 0.59 was used; in the second, hereinafter referred to as Sample No. 39, a commercially available poly(ethylene terephthalate) having an IV of 0.72 and identical to that used in Example 4 was used; and in the third, hereinafter referred to as Sample No. 40, a commercially available poly(ethylene terephthalate) having an IV of 1.04 was used. The three polyester resin compositions were prepared in the same manner as is summarized in Example 1. After preparation, portions of each compositions were molded into ⅛" bars and the notched Izod value at room temperature determined in the same manner as indicated in Example 1. The results obtained with each Sample and the IV of the polyester used therein are summarized in the following Table:

| Sample No. | IV of Polyester | Notched Izod, Room Temperature (Ft. lb./in.) |
|---|---|---|
| 38 | 0.59 | 3.6 |
| 39 | 0.72 | 13.1 |
| 40 | 1.04 | 16.8 |

As will be apparent from the data summarized in the preceding Table, the room temperature Notched Izod value of the molded product prepared with the polyester resin composition increased with increasing IV of the polyester used therein.

While the present invention has been described and illustrated by reference to particular embodiments thereof, it will be appreciated by those of ordinary skill in the art that the invention lends itself to variations not necessarily described or illustrated herein. For this reason, then, reference should be made solely to the appended claims for purposes of determining the true scope of the present invention.

What is claimed is:

1. Impact resistant polymeric compositions comprising
    a) 70% by weight of a first phase consisting of a thermoplastic poly(alkylene terephthalate) polyester having an intrinsic viscosity of at least 0.72, and
    b) 30% by weight of a second phase consisting of a modified block copolymer for supertoughening the composition, wherein said block copolymer consists of the structure A-B-A wherein each A block is at least predominantly a polymerized styrene block having a weight average molecular weight of about 7,200 and each B block is a selectively hydrogenated butadiene block having a weight average molecular weight of about 35,000, said modified block copolymer having a residual unsaturation less than 2% based on the original ethylenic unsaturation prior to hydrogenating and grafted thereto from 0.8% to 2.6% by weight of maleic anhydride, substantially all of said anhydride being grafted to said block copolymer on said B blocks.

2. The composition according to claim 1, wherein said amount of maleic anhydride is on the average from about 1.7% w to about 1.9% w based on said block copolymer.

3. The composition according to claim 1, wherein said residual ethylenic unsaturation of said block copolymer is 0.7% based on the original ethylenic unsaturation of block copolymer prior to hydrogenation.

4. The composition according to claim 1, wherein said thermoplastic polyester is a poly(ethylene terephthalate).

* * * * *